Patented Sept. 21, 1937

2,093,402

UNITED STATES PATENT OFFICE 2,093,402

PRINTING AND DYEING COMPOSITIONS AND PROCESSES

Miles Augustinus Dahlen, Wilmington, Del., assignor to E. I. du Pont de Nemours & Company, Wilmington, Del., a corporation of Delaware No Drawing. Application November 13, 1935, Serial No. 49,461

9 Claims. (Cl. 8—5)

A. This invention relates to new compositions of matter and to dyeing. More particularly the invention relates to new compositions of matter including azo dyes, and to processes of employing them, particularly in printing processes. The invention will be described with reference to particular examples which are illustrative but not limitative thereof.

B. The azo dyes are a well-defined group containing the chromophor —N=N—. The chromogen of azo dyestuffs comprises two aryl radicals with the chromophor between them. The mono azo dyes are generally prepared by joining two components of which the first, an amine, is called the azo component, and the second, usually a phenol, an amine, or an active methylene compound, is called the coupling component. In coupling the components, the azo component is diazotized, and is reacted with the second component, usually in solution.

C. The azo dyes of the prior art are applied by one of several processes that have been devised to take advantage of the nature of particular dyes: (a) The dyestuff is dissolved or dispersed in a suitable liquid medium and the material to be dyed is dipped therein. Satisfactory results are obtained by this method only if the completed dyestuff is substantive to the material which is to be dyed. (b) A substantive coupling component, or a substantive azo component, is directly affixed to the material, and the diazotized component or the coupling component, respectively, is coupled thereto, completing the dye on the material. (c) An azo component is diazotized and coupled to a compound with which it forms a new compound stable in alkaline or neutral medium, and is mixed with the coupling component and with the other ingredients of a basic or neutral printing paste, or solution. The material to be dyed is impregnated with the paste, or with the solution, by printing or in any other satisfactory manner and the dye is formed on the material by reaction with an acid, whereby it is freed and enabled to react with the coupling component. This invention relates to new compositions of matter to be applied by the third of these methods, and to processes of applying them.

D. It is an object of the invention to prepare new compositions of matter suitable for the printing of textile fibers and other dyeable material. Another object of the invention is to prepare mixtures of stable, water-soluble diazoimino compounds and mono-azo compounds capable of coupling with diazo salts. Other objects of the invention are to produce new compositions of matter suitable for dyeing, and new processes of applying them.

E. The objects of the invention are attained, generally speaking, by stabilizing a diazotized primary arylamine against reaction with a coupling component in alkaline or neutral medium and by mixing it with compounds having the general formula $$\text{Aryl—N=N—aryl}$$

in which the aryl nuclei are preferably of the benzene or naphthalene series, but may be of other series, and in which one of the nuclei is capable of coupling with a diazotized arylamine. Other objects of the invention are attained by preparing the said mixtures as dry powders, as paste, or in solution, and by incorporating them in printing pastes and other dyeing compositions.

EE. The objects of the invention are accomplished, in one specific modification, by impregnating a fabric or a fiberous material with a basic or neutral paste containing a mixture of the stabilized azo component and the coupling component and exposing the impregnated material, preferably at elevated temperature, to the action of a preferably mild acid. Still other objects of the invention are accomplished by the processes of applying the new compositions of matter more fully hereinafter set forth.

F. In the practice of the invention the azo component is stabilized against reaction in alkaline or neutral medium with a coupling component either by forming the nitrosamine or a diazoimino compound thereof, of which both methods will be understood by persons skilled in the art. The stabilized azo component will then be mixed in the form of dry powder, a paste, or a solution with the alkaline or neutral mass containing the coupling component. The details of the processes of practicing the invention will differ somewhat according to the state of the ingredients but the general method is to impregnate the colorable material with the so-formed mixture, and to act upon it with enough acid to regenerate the azo component and permit it to act upon the coupling component.

G. In the form of the invention which involves the dyeing of a cloth by the so-called process of printing, the azo component, diazotized and stabilized as hereinabove described, is mixed in a basic paste with the coupling component, the paste is applied to an etched or "printing" roller which impregnates the fabric by contact, the fabric is placed in a closed container, and is subjected for a few seconds, at elevated temperature and usually in the presence of water vapor, to the action of the fumes of an acid which neutralizes the basicity of the paste, breaks up the stabilized complex, and frees the azo component for reaction with the coupling component.

H. The azo components may advantageously include as substituents in the aryl nucleus from one to five of the group alkyl, alkoxy, halogen, aryloxy, aralkyl, aralykoxy, aryl, hydroaryloxy, and trifluoro-alkyl, but generally speaking satisfactory results are obtained by the use of azo components having from one to three of these substituents. Illustrative of the general utility as azo components of the primary arylamines are the following:

Ortho-chloro-aniline.
2:5-dichloro-aniline.
4-chloro-2-amino-phenetol.
Ortho anisidine.
4-chloro-2:5-dimethyl-aniline.
4-benzoyl-amino-2:5-dimethoxy-aniline.
5-nitro-2-amino-anisole.
1-methoxy-2-naphthylamine.
4-chloro-2-amino-diphenyl-ether.
Meta-amino-benzo-trifluoride.
Ortho-amino-azo-toluene.
4:4'-diamino-diphenylamine.
3-amino-carbazole.

I. The coupling components used in this invention are preformed azo compounds. The following classes of compounds illustrate the inclusive nature of the invention without limiting its scope. Among the azo compounds useful as coupling components there are the mono and polyhydroxy derivatives of azo compounds of the benzene, naphthalene, anthracene, and diphenyl series and of the classes represented by the following specific members:

para-nitro-benzene-azo-phloro-glucinol—

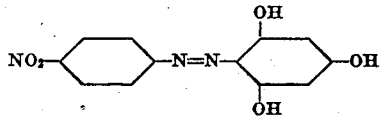

2:5-dichloro-benzene-azo-2:7-dihydroxy-naphthalene—

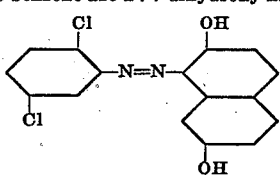

para-methyl-benzene-azo-1:5-dihydroxy-naphthalene—

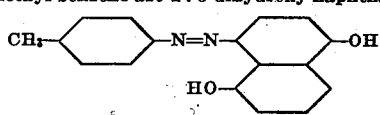

3-(para-nitro-benzene-azo)-4:4'-dihydroxy-diphenyl—

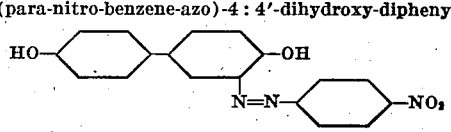

Benzene-azo-1:5-dihydroxy-anthracene

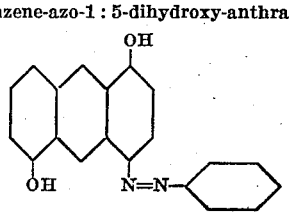

Also useful are the aryl azo derivatives of polyamines of the benzene, naphthalene, and higher aromatic series. Exemplary of those compounds are the following:

Benzene-azo-meta-phenylene-diamine—

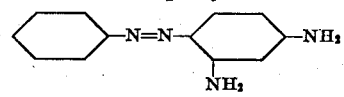

Benzene-azo-1:5-diamino-naphthalene—

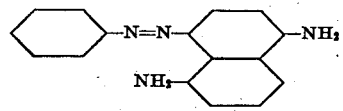

The aryl-azo derivatives of hydroxy-arylamines of the general formula:

$$(NH_2)_x\text{—aryl—}(OH)_y$$

in which aryl is preferably, but not necessarily, of the benzene and naphthalene series and X and Y are small integers, in the preferred form of the invention being individually less than 4 and in combination at least 2. The representative compounds of this type are the following:

Para-chloro-benzene-azo-meta-amino-phenol—

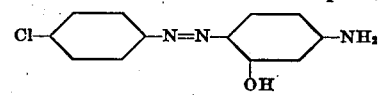

Benzene-azo-3:5-dihydroxy-aniline—

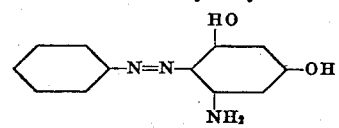

2:5-dichloro-benzene-azo-2-amino-7-hydroxy-naphthalene—

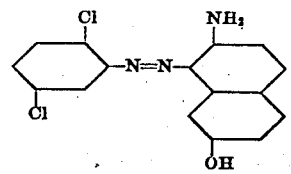

2:5-dichloro-benzene-azo-1-amino-5-naphthal—

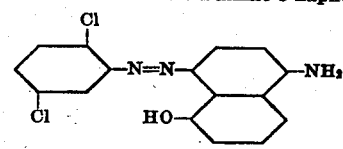

2-nitro-4-methyl-benzene-azo-2-amino-6-naphthol—

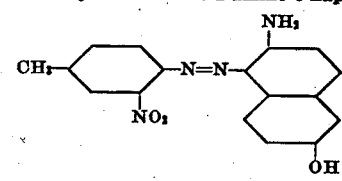

Alpha-naphthalene-azo-1-amino-6-naphthol—

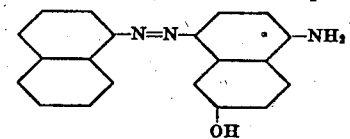

Benzene-azo-1:3-diamino-5-hydroxy-naphthalene—

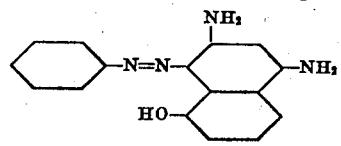

Para-nitro-benzene-azo-4-amino-1:5-dihydroxy-naphthalene—

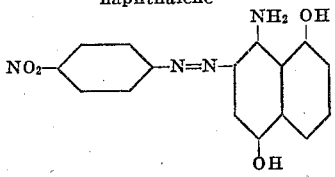

J. Any of the usual stabilizing agents may be used in the preparation of water-soluble diazoimino compounds. The following are exemplary, but not limitative, of the class:

Sarcosin.
1-methyl-amino-ethane-2-sulfonic-acid.
Proline.
Nipecotinic-acid.
Benzylene-imine-para-sulfonic-acid.
1-naphthylamine-2:4:8-trisulfonic-acid.
2-ethyl-amino-4-sulfo-benzoic-acid.

Examples of other derivatives of diazotized arylamines which are inactive toward coupling components under alkaline conditions, but which revert to the diazo form when reacted upon by acids, are for instance the so-called azo-sulfonates.

K. The following examples, in which parts are by weight, are designed to illustrate but not to limit the various features of the invention:

Example I 13.8 parts of meta-nitraniline were stirred with 2.5 parts of commercial hydrochloric-acid (20° Bé.), then diazotized by the addition of 7 parts of sodium-nitrite in the form of a 30% solution, ice being added as required to hold the temperature below 5° C. The volume at this point was 800 parts. 17.6 parts of 1:7-amino-naphthol were dissolved in 1200 parts of water and 11 parts of commercial hydrochloric acid. The diazo solution which was prepared above was added to the solution of amino-naphthol, and the mass stirred for 16 hours, the temperature being held at 0–5° C. by external cooling. The product was filtered off, washed free from acid and dried. The yield was 28 parts of the material of the formula:

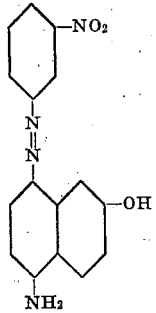

Two parts of the coupling component obtained above were ground with two parts of the water-soluble diazoimino compound obtained by the action of diazotized 4-chloro-2-amino-anisole on piperidine-alpha-carboxylic-acid. A printing paste was prepared, according to the following formula:

| | Parts |
|---|---|
| Color mixture | 4 |
| Sodium-hydroxide of 35% strength | 3 |
| Monopole oil | 1 |
| Starch tragacanth thickener | 70 |
| Water | 22 |
| | 100 |

Cotton piece goods were printed from an engraved roll with the above paste. The prints were subjected to the action of live steam containing the vapors of acetic and formic acids. The print was developed to a deep brown, due to the formation of the color of the following constitution:

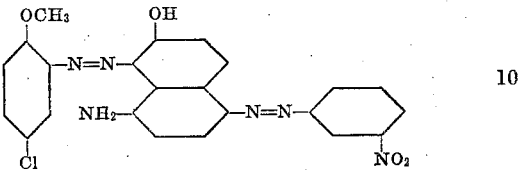

Example II

By a procedure similar to that described in Example I, the coupling component of the following structure was prepared by the action of diazotized 4-chloro-2-amino-anisole on 1:7-amino-naphthol:

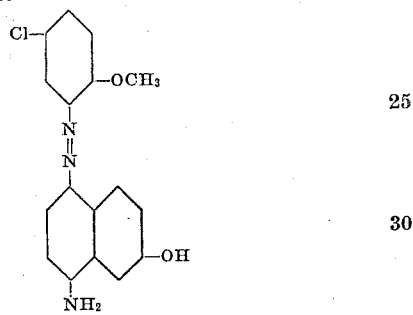

1.9 parts of this coupling component were mixed with 2.1 parts of the water-soluble diazoimino compound obtained by the action of diazotized 4-chloro-2-amino-anisole on methyl-glucamine. This mixture was made up to a printing paste and applied to the fiber by procedures similar to those described in Example I. The fabric was dyed to a deep brown shade, due to the formation of the color of the formula:

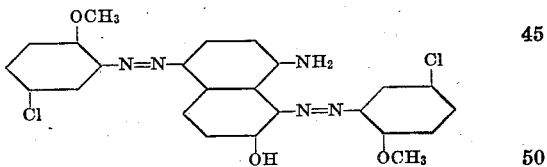

Example III

The following dye paste was prepared:

| | Parts |
|---|---|
| Coupling component described in the preceding example (4-chloro-2-amino-anisole acid 1:7-amino-napthol) | 16 |
| Nitrosamine (anti-diazotate) from 4-chloro-2-amino-anisole | 12 |
| Leukanol | 3 |
| Sodium-hydroxide | 10 |
| Water | 59 |
| | 100 |

The printing paste was prepared according to the following formulation:

| | Parts |
|---|---|
| Paste of the above composition | 8 |
| Sodium-hydroxide of 35% strength | 2 |
| Starch tragacanth thickener | 70 |
| Water | 20 |
| | 100 |

Cotton piece goods were printed with the above paste. The prints were developed by subjecting to the action of steam plus the vapors of acetic acid. The prints were soaped, rinsed and dried. The pattern was developed to a deep brown, due to the formation of the color of the formula given in Example II.

Alternatively, the prints were developed by immersion in a weak solution of acetic-acid containing sodium-chromate, at a temperature of about 160° F. This is the well-known procedure for the development of the nitrosamine type printing pastes.

The following table lists additional mixtures of water-soluble diazoimino compounds with coupling components of the above type, which mixtures may be used in the printing processes illustrated in the examples:

| Example No. | Diazo component | | | Coupling component | Parts | Shade |
|---|---|---|---|---|---|---|
| | Arylamine diazotized | Stabilizer | Parts | | | |
| IV | 4-chloro-2-amino-toluene. | Piperidine-a-carboxylic-acid. | 1.9 | 4-chloro-2-amino-anisole acid 1:7 -> amino-naphthol. | 2.1 | Deep brown. |
| V | Aniline | do | 1.9 | do | 2.1 | Brown. |
| VI | 4-chloro-2-amino-anisole. | do | 2.0 | do | 2.0 | Deep brown. |
| VII | do | Sarcosine | 1.9 | 5-nitro-2-amino-anisole acid 1:7 -> amino-naphthol. | 2.0 | Do. |
| VIII | 4-chloro-2-amino-toluene. | Piperidine-a-carboxylic-acid. | 1.9 | do | 2.1 | Do. |
| IX | Dianisidine | Methyl-glucamine | 2.0 | do | 2.0 | Black. |
| X | Nitrosamine from 4-chloro-2-amino-anisole. | do | 12.0 | 2:5-dichloro-aniline acid 1:7 amino-naphthol. | 16.0 | Deep brown. |
| XI | 4-chloro-2-amino-anisole. | Piperidine-a-carboxylic-acid | 2.0 | Aniline acid 1:7 -> amino-naphthol. | 2.0 | Reddish black. |
| XII | 4-chloro-2-amino-toluene. | do | 2.0 | do | 2.0 | Dark brown. |
| XIII | Dianisidine | Methyl-glucamine | 2.0 | do | 2.0 | Greenish black. |
| XIV | 4-chloro-2-amino-anisole. | Piperidine-a-carboxylic-acid. | 2.0 | 3-chlor-aniline acid 1:7-amino-naphthol. | 2.0 | Dark brown. |
| XV | 4-chloro-2-amino-toluene. | do | 2.0 | do | 2.0 | Do. |
| XVI | Dianisidine | Methyl-glucamine | 2.0 | do | 2.0 | Greenish black. |
| XVII | 4-chloro-2-amino-anisole. | Piperidine-a-carboxylic-acid. | 2.0 | 4-nitro-aniline acid 1:7-amino-naphthol. | 2.0 | Reddish black. |
| XVIII | 4-chloro-2-amino-toluene. | do | 2 | do | 2 | Dark brown. |
| XIX | Dianisidine | Methyl-glucamine | 2 | do | 2 | Greenish black. |
| XX | 4-chloro-2-amino-anisole. | Piperidine-a-carboxylic-acid. | 2 | 2:5-dichloro-aniline acid 1:7-amino-naphthol. | 2 | Dark brown. |
| XXI | 4-chloro-2-amino-toluene. | do | 2 | do | 2 | Chocolate brown. |
| XXII | Dianisidine | Methyl-glucamine | 2 | do | 2 | Greenish black. |
| XXIII | 4-chloro-2-amino-anisole. | Piperidine-a-carboxylic-acid. | 2 | 4-chloro-2-nitro-aniline acid 1:7-amino-naphthol. | 2 | Dark brown. |
| XXIV | 4-chloro-2 amino-toluene. | do | 2 | do | 2 | Do. |
| XXV | Dianisidine | Methyl-glucamine | 2 | do | 2 | Greenish black. |
| XXVI | 4-chloro-2-amino-anisole. | Piperidine-a-carboxylic-acid. | 2 | 2:5-dichloro-4-nitro-aniline acid 1:7-amino-naphthol. | 2 | Black. |
| XXVII | Dianisidine | Methyl-glucamine | 2 | do | 2 | Greenish black. |
| XXVIII | 4-chloro-2-amino-anisole. | Piperidine-a-carboxylic-acid. | 2 | 2:4-dimethyl-6-nitro-aniline acid 1:7-amino-naphthol. | 2 | Black. |
| XXIX | do | do | 2 | 2:5-diethoxy-4-nitro-aniline acid 1:7-amino-naphthol. | 2 | Do. |
| XXX | 4-chloro-2-amino-anisole. | do | 2 | meta-amino-benzotrifluoride acid 1:7-amino-naphthol. | 2 | Dark brown. |
| XXXI | do | do | 2 | 4-chloro-2-amino-toluene acid 1:7-amino-naphthol. | 2 | Do. |
| XXXII | 4-chloro-2-amino-toluene | do | 2 | do | 2 | Do. |
| XXXIII | Dianisidine | Methyl-glucamine | 2 | do | 2 | Greenish black. |
| XXXIV | 4-chloro-2-amino-anisole. | Piperidine-a-carboxylic-acid. | 2 | 4-nitro-2-amino-toluene acid 1:7-amino-naphthol. | 2 | Dark brown. |
| XXXV | do | do | 2 | 3-nitro-4-amino-toluene acid 1:7-amino-naphthol. | 2 | Do. |
| XXXVI | 4-chloro-2-amino-toluene. | do | 2 | do | 2 | Chocolate brown. |
| XXXVII | Dianisidine | Methyl-glucamine | 2 | do | 2 | Greenish black. |
| XXXVIII | 4-chloro-2-amino-anisole. | Piperidine-a-carboxylic-acid. | 2 | 4-chloro-2-amino-anisole acid 1:7-amino-naphthol. | 2 | Dark brown. |
| XXXIX | 4-chloro-2-amino-toluene. | do | 2 | do | 2 | Do. |
| XL | Dianisidine | Methyl-glucamine | 2 | do | 2 | Greenish-black. |

| Example No. | Diazo component | | | Coupling component | Parts | Shade |
|---|---|---|---|---|---|---|
| | Arylamine diazotized | Stabilizer | Parts | | | |
| XLI | 4-chloro-2-amino-anisole. | Piperidine-a-carboxylic-acid. | 2 | 4-nitro-2-amino-anisole acid 1:7-→ amino-naphthol. | 2 | Dark brown. |
| XLII | ----do---- | ----do---- | 2 | 5-nitro-2-amino-anisole acid 1:7-→ amino-naphthol. | 2 | Black. |
| XLIII | 4-chloro-2-amino-anisole. | ----do---- | 2 | 3-nitro-4-amino-anisole acid 1:7-→ amino-naphthol. | 2 | Dark brown. |
| XLIV | ----do---- | ----do---- | 2 | alpha-naphthylamine acid 1:7-amino-→ naphthol. | 2 | Do. |
| XLV | ----do---- | ----do---- | 2 | beta-naphthylamine acid 1:7-amino-→ naphthol. | 2 | Do. |
| XLVI | ----do---- | ----do---- | 2 | alpha-amino-anthraquinone acid 1:7-→ amino-naphthol. | 2 | Do. |

*Example XLVII*

A printing paste was prepared according to the following formula:

Benzene-azo-resorcinol of the structure:

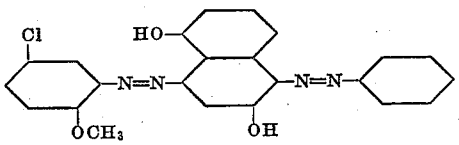

|   | Parts |
|---|---|
| | 2 |
| Water-soluble diazoimino compound obtained by the action of diazotized 4-chloro-2-amino-anisole on piperidine-alpha-carboxylic-acid | 2 |
| Sodium-hydroxide of 35% strength | 3 |
| Monopole oil | 1 |
| Starch tragacanth thickener | 70 |
| Water | 22 |
| | 100 |

Cotton piece goods were printed and developed by a procedure similar to that described in Example I. The pattern was developed as a brown, due to the formation of the color of the probable structure:

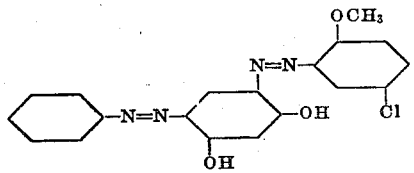

*Example XLVIII*

The process of Example XLVII was repeated, using 2 parts of benzene-azo-2:5-dihydroxy-naphthalene of the following structure:

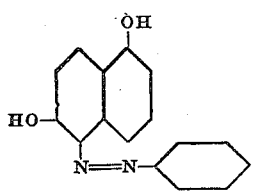

instead of the benzene-azo-resorcinol. The printed pattern was developed to a brown, due to the formation of the color of the probable structure:

L. The invention is applicable to the dyeing of cotton, regenerated cellulose, cellulose esters and ethers and, with somewhat less satisfactory results, to the dyeing of wool, silk, and leather.

M. The ratio of diazo to coupling components in the mixtures will depend to a large extent upon the nature of the components and the results desired. In many instances excellent results are obtained by mixing the components in equimolecular ratio, but if the coupling components are capable of coupling with two or more mols of the diazo salt, or if the diazotized derivative of arylene-polyamine is used, an increased ratio of the other component will obviously produce the most advantageous results. The compositions may be produced in the form of dry powders, pastes, or solutions. These pastes and solutions may contain water and/or liquids such as ethyl alcohol, the monoethyl ether of ethylene glycol, ethanol-amine, and the like solvents which are miscible with water. These solutions must be neutral or alkaline until coupling of the components is desired in order to prevent premature regeneration and coupling of the diazo component. The examples illustrate only the printing of textile fibers, but impregnation of fibers may be carried out in any satisfactory manner. Furthermore, the new compositions may be dissolved or suspended in water, or in any other suitable medium and treated with mild acids to produce insoluble pigments.

Mm. The term "leukanol" refers to the product formed by condensing naphthalene-beta-sulfonic-acid with formaldehyde. The term "monopole oil", as herein used, refers to sulfonated castor oil.

N. This new class of compositions and the new process make possible the dyeing and printing of suitable materials in very dark brown and black shades by the recently developed one-bath process, for which heretofore no products were available. The new compositions are readily manufactured at a reasonable cost, and produce colors of satisfactory fastness.

O. As many apparently widely different embodiments of this invention may be made without departing from the spirit and scope thereof, it is to be understood that I do not limit myself to the specific embodiments thereof except as defined in the appended claims.

I claim:

1. The process which comprises impregnating a material derived from a fibrous organic substance with one of a group of compounds consisting of a primary aryl nitrosamine and a primary aryl diazoimino compound and with a compound represented by the formula:

Aryl—N=N—aryl in which aryl are radicals from the group consisting of the benzene and naphthalene series, in a stabilizing medium, and coupling the diazotized amine to the said compound, the components being free from water-solubilizing groups.

2. The method of dyeing which comprises impregnating a dyeable fibrous material with a composition comprising 2 parts of 35% sodium hydroxide aqueous solution, 70 parts starch-gum tragacanth thickener, 20 parts water and 8 parts of a composition containing 10 parts of sodium hydroxide, 12 parts of the nitrosamine of 4-chloro-2-amino-anisole, 16 parts of an azo coupling component represented by the formula

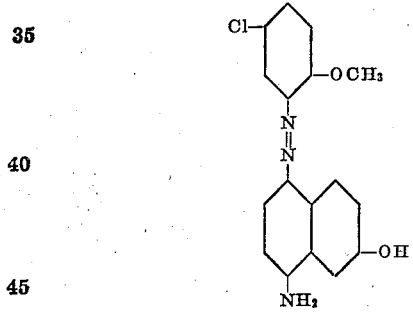

3 parts leukanol, and 59 parts of water, and subjecting the impregnated material to the action of hot, dilute acid vapors.

3. The method of dyeing which comprises impregnating a dyeable fibrous material with a composition comprising an aqueous alkaline solution, a thickener, water, leukanol, about 12 parts of the nitrosamine of 4-chloro-2-amino-anisole, about 16 parts of an azo coupling component represented by the formula

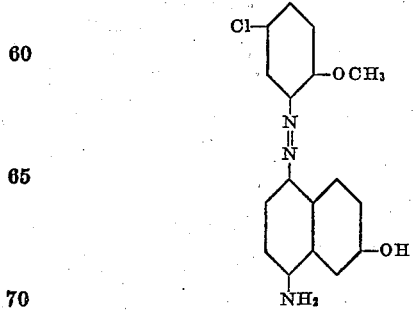

and subjecting the impregnated material to the action of an acid.

4. The method of dyeing which comprises impregnating a dyeable material of fibrous organic origin with a non-acid composition comprising a thickener, water, an alkali-stable diazoimino compound of 4-chloro-2-amino-anisole, and an azo coupling component represented by the formula

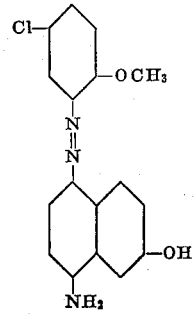

and subjecting the impregnated material to the action of an acid.

5. The method of dyeing which comprises impregnating a dyeable fibrous material with a composition comprising an aryl diazoimino compound stable under alkaline conditions, sodium hydroxide, and an azo coupling component represented by the formula Aryl—N=N—aryl in which the aryl nuclei are selected from the group consisting of the benzene and naphthalene series and in which one aryl nucleus is capable of coupling with a diazo salt, and subjecting the impregnated material to the action of an acid, the components being free from water-solubilizing groups.

6. A composition of matter comprising 2 parts 35% sodium hydroxide aqueous solution, 70 parts starch-gum tragacanth thickener, 20 parts water and 8 parts of a composition containing 10 parts of sodium hydroxide, 12 parts of the nitrosamine of 4-chloro-2-amino-anisole, 16 parts of an azo coupling component represented by the formula

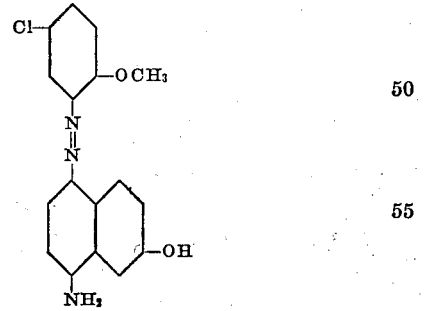

3 parts of leukanol, and 59 parts of water.

7. A composition of matter which comprises an aryl diazoimino compound stable under alkaline conditions, an alkali, and a compound represented by the formula

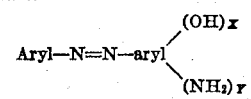

in which X and Y are each integers less than 4 and X+Y are at least 2, the components being free from water-solubilizing groups.

8. A composition of matter which comprises an aryl diazoimino compound stable in alkaline medium, an alkali, and an azo coupling component represented by the formula

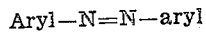

in which the aryl nuclei are selected from the group consisting of the benzene and naphthalene series and in which at least one aryl nucleus is capable of coupling with a diazo salt, the components being free from water-solubilizing groups.

9. A non-acid composition of matter which comprises an aryl diazoimino compound stable in non-acid medium, and a compound represented by the formula

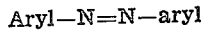

in which one aryl nucleus is capable of coupling with a diazotized arylamine, the components being free from water-solubilizing groups.

MILES AUGUSTINUS DAHLEN.